Jan. 8, 1946. S. G. HARWOOD 2,392,319
VALVE STRUCTURE
Filed March 5, 1943 2 Sheets-Sheet 1
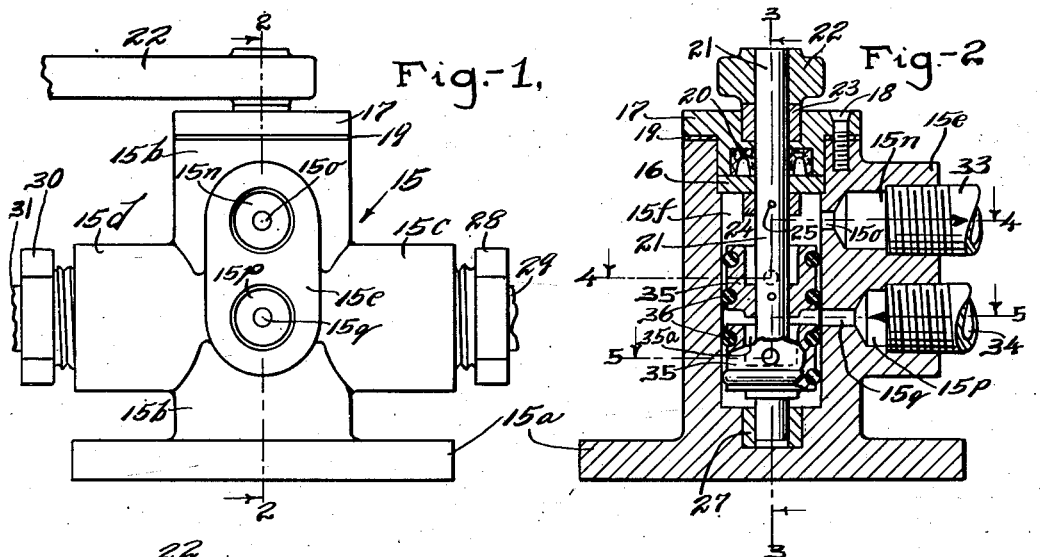
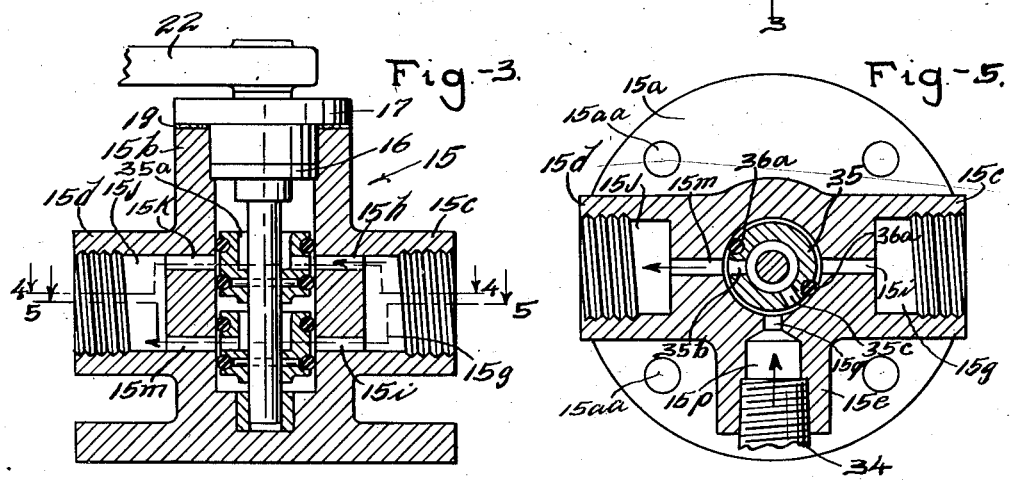
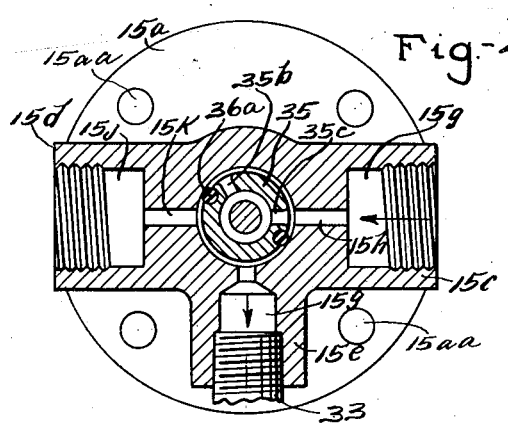
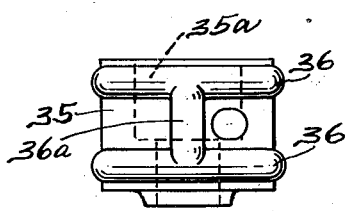
Inventor:
STANLEY G. HARWOOD
By Chas. E. Reif.
Attorney.

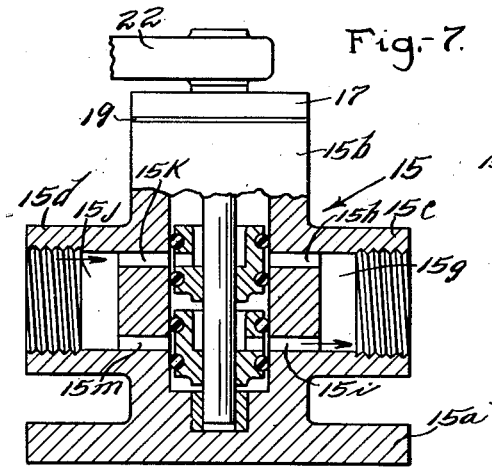

Patented Jan. 8, 1946

2,392,319

UNITED STATES PATENT OFFICE 2,392,319

VALVE STRUCTURE

Stanley G. Harwood, San Marino, Calif.

Application March 5, 1943, Serial No. 478,093

5 Claims. (Cl. 251—103)

This invention relates to a valve structure, and particularly to a valve of the oscillating or rotating type for controlling the flow of fluids through various conduits.

It is an object of this invention to provide an efficient valve which is simple in construction, easily turned and one in which the thrust due to the liquid is balanced.

It is also an object of this invention to provide a valve member adapted to turn in a cylindrical recess, the same having a passage extending therethrough adapted to be moved into and out of alignment with a passage extending transversely of and communicating with said recess, said member having annular portions of yielding material above and below the passage therethrough adapted to tightly engage the wall of said recess and having vertical portions at the ends of the passage therethrough extending between said annular portions and also tightly engaging the wall of said recess.

It is a further object of the invention to provide a valve structure as set forth in the preceding paragraph together with a shaft or stem extending axially through said member for oscillating the same, said member having a chamber therein surrounding said shaft or rod and communicating with one end of said member whereby two or more of said members may be spaced vertically on said shaft.

It is another object of the invention to provide a casing having a recess therein with vertically spaced inlet and outlet passages communicating with said recess, said casing also having vertically spaced passages at either side thereof circumferentially spaced from said inlet and outlet passages together with a pair of vertically spaced valve members in said recess carried on a shaft extending axially thereof by which they may be oscillated, said members having passages extending therethrough adapted to be brought into and out of alignment with said last mentioned passages in said casing.

It is also an object of this invention to provide a valve structure comprising a casing having a cylindrical recess therein, said casing having inlet and outlet conduits communicating with the recess therein and having inlet and outlet service conduits communicating with the recess therein together with a pair of vertically spaced valve members in said recess adapted to be turned and constructed and arranged to be balanced vertically by the fluid passing therethrough and having openings adapted to be brought into and out of alignment with said service conduits.

These and other objects and advantages of the invention will be fully set forth in the following description made in connection with the accompanying drawings in which like reference characters refer to similar parts throughout the several views and in which:

Fig. 1 is a view in side elevation of the valve;

Fig. 2 is a vertical section taken on line 2—2 of Fig. 1 as indicated by the arrows;

Fig. 3 is a vertical section taken on line 3—3 of Fig. 2 as indicated by the arrows;

Fig. 4 is a horizontal section taken on line 4—4 of Figs. 2 and 3 indicated by the arrows;

Fig. 5 is a horizontal section taken on line 5—5 of Figs. 2 and 3 indicated by the arrows;

Fig. 6 is a view in side elevation of the valve member used;

Fig. 7 is a view similar to Fig. 3 showing the valve in a different position;

Fig. 8 is a view similar to Fig. 4 showing the valve in a different position;

Fig. 9 is a view similar to Fig. 5 showing the valve in a different position;

Fig. 10 is a view in central vertical section through a modified form of valve;

Fig. 11 is a horizontal section taken on line 11—11 of Fig. 10 as indicated by the arrows;

Fig. 12 is a view similar to Fig. 11 showing the valve in a different position; and Fig. 13 is a view in side elevation of the valve member used in Figs. 10 to 12.

Referring to the drawings, a valve structure is shown comprising a casing 15. While this casing could be variously formed, in the embodiment of the invention illustrated it is shown as having a base portion or flange 15a by means of which it could be attached to another member by bolts or screws passing through the holes 15aa in said base. A central substantially cylindrical portion or body 15b upstands from base 15a. Portion 15b has extending from opposite sides thereof bosses 15c and 15d illustrated as substantially cylindrical in form and portion 15b also has extending laterally therefrom an elongated boss 15e having upper and lower semi-cylindrical ends. Portion 15e is disposed at an angle to portions 15c and 15d and in the embodiment of the invention illustrated it is shown as extending at right angles to bosses 15c and 15d. Portion 15b has a cylindrical recess 15f therein which is counterbored at its upper end to receive a packing washer 16 and a closing cap plug 17, which latter is secured to the upper end of portion 15b by the circumferentially spaced screws 18 extending through member 17 and into portion 15b. A gasket 19 is disposed between member 17 and the top of portion 15b. A packing member 20 is shown in the bottom portion of member 17 and is forced into engagement with the latter by the pressure of fluid. A shaft or rod 21 extends axially through member 17 centrally of the recess 15f and has an operating handle or lever 22 secured at its upper end. Shaft 21 also extends through an oilite bearing 23 recessed into the top of member 17. A collar 24 is secured to shaft 21 below collar 16 in any suitable manner as by a pin 25. Shaft 21 extends entirely through the recess 15f and has its lower end journalled in a plug or bushing 27 disposed in a recess in the lower portion of member 15. The boss 15c is provided with a bore 15g threaded at its outer end for the attachment of a conduit or connection 28 which may receive a conduit 29. A comparatively small passage 15h extends from the upper portion of bore 15g into recess 15f and a similar passage 15i extends from the lower portion of bore 15g into the passage 15f. Boss 15d is provided with a bore 15j threaded at its outer end for the attachment of a conduit or connection 30 which may receive a conduit 31. A passage 15k extends from the upper end of passage 15j into passage 15f and another similar passage 15m extends from the lower portion of bore 15j into the recess 15f. The boss 15e is provided at its upper portion with a bore 15n threaded at its outer end for the attachment of a conduit 33 and a passage 15o leads from bore 15n into recess 15f. Boss 15e is provided with a bore 15p at its lower end threaded at its outer portion for the attachment of a conduit 34 and a passage 15q extends from bore 15p into the recess 15f.

Shaft 21 has secured thereto within recess 15f in vertically spaced relation a pair of similar members 35. Member 35 is shown in side elevation in Fig. 6 and is preferably substantially cylindrical in form, the same having a cylindrical recess 35a open at one end of said member which is illustrated as the upper end thereof. A passage 35b leads from recess 35a to the outer side of member 35 and another passage 35c leads from recess 35a to the outer side of member 35. Passages 35b and 35c are preferably disposed at an angle to each other and in the embodiment of the invention illustrated this angle is substantially 120 degrees. Member 35 has annular gaskets 36 extending thereabout above and below the passages 35b and 35c, the same being of yielding or resilient material and constructed and arranged to tightly engage the wall of recess 15f. While these gaskets may be made of various forms, in the embodiment of the invention illustrated they are shown as circular in transverse cross section. Vertical gaskets 36a extend between gaskets 36 and while these might be variously formed, in the embodiment of the invention illustrated they are shown as part of and connecting gaskets 36. The vertical gaskets 36 are disposed beyond the remote ends of the passages 35c and 35b as clearly shown in Figs. 4 and 5. Gaskets 36a also tightly engage the wall of recess 15f.

In the operation of the valve structure above described, liquid handled can be supplied through the conduit 34. The liquid will pass through passage 15q into the space between the valve members 35. From here it will pass into the recess 35a of the lower member 35 and will pass out through passage 15m into bore 15j and into the conduit connected thereto. The liquid will be supplied through said conduit to any desired point. The liquid can be constantly supplied or it can be intermittently supplied to operate some hydraulic apparatus such as a diaphragm valve. In either case if the liquid is continuously circulated so that it is returned through the valve it will be returned through a conduit connected to communicate with bore 15g and will pass through the passage 15h into passage 35c of the upper member 35 and will then pass through the chamber 35a of upper member 35 into recess 15f and will pass out through passage 15o into bore 15n and out through conduit 33. It will be noted that with the arrangement of the members 35, the vertical thrust on members 35 and the valve rod will be balanced. The pressure from the incoming fluid which usually is relatively high is exerted equally upon the upper and lower members 35. There is thus very little if any, vertical thrust on the shaft 21. In practice a connection (not shown) may be made between the outlet passage and the bottom of bore 15f thus balancing the pressure of the outlet fluid, which pressure will be quite small.

With the arrangement disclosed the flow of the liquid can be quickly reversed by swinging the lever or handle 22 to bring the passages 35b and 35c into different positions. When this is done the members 35 will be moved from the positions shown in Figs. 4 and 5 to the positions shown in Figs. 8 and 9. With the valve turned as shown in Figs. 8 and 9, the liquid would then enter the valve through conduit 34 as before and between members 35. It would pass through chamber 35a of lower member 35 out through passage 35c into passage 15i of lower member 35 and out through passage 15g. The liquid would be conveyed to the desired point or apparatus and the return liquid would pass through conduit 31 into bore 15j through passage 15k and through passage 35c of the upper member 35 upward through the chamber 35a of the upper member 30 to passage 15o into bore 15n and out through conduit 33 which is the outlet conduit. As before set forth the vertical thrust on shaft 21 is balanced by the fluid.

In Figs. 10 to 13 a modified form of valve is shown comprising a casing 40 of general cylindrical form having oppositely extending bosses 40a and 40b. Boss 40a is provided with a bore 40c threaded at its outer end to receive a suitable conduit. Boss 40b is provided with a bore 40d which is also threaded at its outer end for the attachment of a suitable conduit. The casing 40 is provided with a central bore or recess 40e of cylindrical form, which bore or recess is threaded at its upper end. A cap or plug 41 has a central portion threaded to screw into the top of casing 40 and has a flange 41a engaging the top of casing 40. A gasket 42 is disposed between flange 41a and the top of casing 40. A valve rod 43 extends centrally through cap 41 and recess 40e and has its lower end journalled in a recess in the bottom of the bore 40e. Rod 43 has secured to its upper end a knob or handle member 44. A valve member 45 is disposed in recess 40e and is secured to valve rod 43. In the embodiment of the invention illustrated valve member 45 and valve rod 43 are shown as integral. Valve member 45 is of general cylindrical form and has a passage 45a extending transversely therethrough adapted to be brought into and out of alignment with passages 40c and 40d. Member 45 has annular gasket members 46 seated therein and extending thereabout above and below passage 45a, which gaskets will be made of yielding or resilient material and are constructed and arranged to tightly engage the wall of bore or recess 40e. Vertical gasket members 46a extend between gaskets 46 at each side of each end of passage 45a as shown in Figs. 11 and 13. While gaskets 46a could be variously formed, in the embodiment of the invention illustrated they are shown as integral with and connecting gaskets 46.

In operation the liquid to be controlled will enter one side of valve casing 40 and if the valve member 40 is in the position shown in Figs. 10 and 11, the liquid can pass through said valve member and out at the conduit at the other side of valve casing 40. The liquid will be prevented from passing into the bore 40e by the gaskets 46 and 46a. When valve rod 43 is turned by handle 44 valve member 45 will be brought to the position shown in Fig. 12. In this position the liquid will be prevented from passing member 45 by the gaskets 46 and 46a so that any passage through casing 40 will be shut off.

From the above description it will be seen that I have provided a very simple and efficient valve construction. The valve members 35 and 45 are quite simple in construction and the gaskets thereon will tightly fit against the valve casing. These gaskets can be easily made and installed and the valve member proper does not have to have a tight fit in the casing. The friction of the gasket members is quite small and the valve can be very easily turned. With the use of two or more of the valve members shown in Figs. 1 to 9 as above explained, the valve is balanced and can thus be very easily turned. It is not necessary to have a valve member with a tight fit in the valve casing. It will readily be seen that quite a number of valve members 35 could be used on the shaft 21 and that the corresponding number of conduits could be controlled by one valve. Such a compound valve could be very easily turned to open and closed position. With such a valve structure adapted for easy turning a very sensitive control can be had and the valve can be used in various regulators and in relief and modulating valve structures. The valve is very suitable for operation by a motor or hydraulic power unit. The present valve makes a very tight closure and the liquid is completely shut off.

By spacing the vertical gaskets of the valve member at the desired angular intervals and rotating the same by clockwork or by synchronized motor this valve can be used to change the direction of flow of one or more streams according to any timing required and as often done in the regeneration of a water softener or filter.

The valve has been amply demonstrated in actual practice and found to be very successful and efficient.

It will of course, be understood that various changes may be made in the form, details, arrangement and proportion of the parts, without departing from the scope of applicant's invention, which generally stated, consists in a device capable of carrying out the objects above set forth, in the parts and combinations of parts disclosed and defined in the appended claims.

What is claimed is:

1. A valve structure comprising a casing having a cylindrical recess therein, a shaft extending axially of said recess, a pair of valve members secured to said shaft in vertically spaced relation, each member being of cylindrical form, each of said members having an annular chamber therein about said shaft and being open at the top of said member, passages extending radially through each of said members from the recess therein at an angle to each other, said casing having an inlet passage extending into said recess between said members, said casing having an outlet passage extending from the recess therein above said members, said casing having pairs of passages extending into the recess therein circumferentially spaced from said inlet and outlet passages, one of the passages in each of said pairs aligning vertically with the passages in said members respectively, whereby a liquid may pass from said inlet conduit downwardly through the chamber in one of said members out through one of the passages of one of said pairs of passages through said casing, and said liquid may return through one of the passages of said other pair of passages through said casing into a passage in the other of said valve members up through the chamber therein into said recess and out through said outlet opening.

2. The structure set forth in claim 1, said valve members each having annular portions of yielding material engaging the wall of said recess above and below the passages in said valve members and having vertical portions of yielding material extending between said annular portions and engaging the wall of said recess at the remote sides of the outer ends of said passages in said valve members.

3. A valve structure having in combination, a member having a cylindrical chamber therein, said chamber having circumferentially spaced passages leading therefrom, a valve member of general cylindrical form disposed in and coaxially with said chamber, said valve member having a central chamber therein and passages extending radially from said chamber to the outer side of said valve member, said valve member having rings of yielding material surrounding the same and engaging the wall of said chamber to form a seal therewith above and below said passages longitudinally of said member and portions of yielding material extending between and joining said rings to form a seal with said wall at the remote sides of said passages through said valve member, said valve member being constructed and arranged to be turned to bring the passages therethrough into and out of register with the passages in said first mentioned member.

4. A valve structure having in combination, a member having a cylindrical chamber therein, said chamber having a pair of circumferentially spaced passages leading therefrom and having a second pair of circumferentially spaced passages leading therefrom spaced longitudinally from said first mentioned passages, a valve member disposed in and coaxially with said chamber, said valve member having rings of yielding material surrounding the same and engaging the wall of said chamber to form a seal therewith at either side of said first mentioned passages longitudinally of said chamber at one side of said first mentioned pair of passages and having vertical portions of yielding material extending between said rings and engaging the wall of said chamber to form a seal therewith, a second valve member disposed in and coaxially with said chamber, said second valve member disposed in and coaxially with said chamber and having rings of yielding material surrounding the same and engaging the walls of said chamber to form a seal therewith at either side of said second mentioned passages and having portions of yielding material extending between and joining said rings to form a seal with said wall, said valve members having central chambers therein and circumferentially spaced passages leading therefrom to the periphery of said valve members adapted to register respectively with the passages in said chamber and means secured to said valve members for rotating them in said chamber.

5. A valve structure having in combination, a valve casing, a cylindrical chamber therein, a plurality of circumferentially spaced pairs of passages extending through said casing from said chamber, the passages of said pairs being spaced longitudinally of said chamber, a pair of longitudinally spaced valve members fitting in said chamber having central recesses therein open at one end of said members and having circumferentially spaced passages leading from said recess to the wall of said chamber, said passages in said members being aligned respectively with one of the passages of each of said pairs, an inlet passage in said casing leading to said chamber between said valve members and an outlet passage leading from said chamber at one end of said valve members and means for oscillating said valve members.

STANLEY G. HARWOOD.